July 31, 1951         J. A. N. DUBREUIL         2,562,704
             FLUID CONTROL FOR MOTOR VEHICLES
Filed Oct. 8, 1945                    7 Sheets-Sheet 1

INVENTOR
Joseph A. N. Dubreuil
BY
Thomas A. Jenckes
ATTORNEY

July 31, 1951 — J. A. N. DUBREUIL — 2,562,704
FLUID CONTROL FOR MOTOR VEHICLES
Filed Oct. 8, 1945 — 7 Sheets-Sheet 2

INVENTOR
Joseph A. N. Dubreuil
BY
Thomas A. Jenkins
ATTORNEY

Patented July 31, 1951

2,562,704

UNITED STATES PATENT OFFICE 2,562,704

FLUID CONTROL FOR MOTOR VEHICLES

Joseph A. N. Dubreuil, Pawtucket, R. I.

Application October 8, 1945, Serial No. 621,147

22 Claims. (Cl. 192—13)

My invention relates to improvements in fluid controls for motor vehicles.

This application covers an alternative embodiment of the principles set forth in my companion application for Hand Control for Motor Vehicles, Ser. No. 620,683, filed October 6, 1945, now Patent No. 2,529,076, issued November 7, 1950, the objects of my invention covered by this invention being in general the same as those in said application.

This application covers a motive fluid pressure operated device with motive fluid forming the source of power for actuating the vehicle control system whether it controls the brake or clutch, the source of power for actuating the "feel" device and the source of power for actuating the follow up device. The fluid pressure for operating my device may be subatmospheric or suction pressure taken from the intake manifold, which permits atmospheric air to provide the supplemental driving power or the fluid pressure may come from preferably liquid in a closed system including a reservoir and a pump.

A main object of my invention is to provide a control system for motor driven vehicles which can be operated by a leg cripple by means of his hands alone, and to make this possible I have provided a control system having motive or booster means for actuating the clutch or applying power to the brakes, and control means therefor which can be actuated by a finger.

A further object of my invention is to provide a control system which may be sold as an attachment for attachment to standard cars and one which is so constructed that the car can still be driven by a person having control of his feet as usual, if desired. In other words, I provide an attachment, which even when attached does not interfere with the normal or standard operation of the vehicle.

A further feature of my invention resides in the fact that I preferably mount my finger controls on the gear shift lever so that the fingers of the hand which operates said gear shift lever may supplementally actuate the finger control means for the brakes and also the finger control means for the clutch leaving the other hand free for operation of the steering wheel and throttle.

I have discovered that the movement of an operating member by a hand to control the booster or servomotor for operating the braking mechanism is not entirely satisfactory in use for there is no way of telling in what degree the brakes have been applied, which vary on so many different factors, such as grade, wind, etc. A further object of my invention is to provide a control device or switch which may be operated by a finger but which actually feels the braking pressure applied, due to resistance to its movement. As in similar devices actuated by a foot pedal, this attainment of "feel" is accomplished by making the operating member, in former instances the brake pedal, in this instance the finger operated movable member, do some of the work in applying the brakes accomplished by this finger operated member as to make the operation of said member finger resistant, and I believe that I am the first, therefore, to provide a "feel" in a finger control and the first to construct a practical finger control device having a "feel." In the devices shown in this application the "feel" device is directly connected to the fluid forming the source of motive power for the servomotor although, if desired, it can be connected to the brake fluid as shown in said other application.

I employ substantially identical systems for actuating the clutch as I employ for actuating the brakes with the exception that the "feel" portion may be omitted from the clutch actuating device, if desired, each connected to the same source of fluid pressure.

To insure that this source will not be exhausted by the application of one of said control means, I provide check valves in the lines connected to the source of fluid pressure supply so that actuation of the second motive means closes the check valve in the line of the first actuated motive means to maintain sufficient pressure therein to continue the operation of the first actuated means, and, in addition, the finger controls for each motive means may both be mounted on the gear shift lever, if desired.

To actuate each control system I provide a fluid motor and a master valve preferably having its own follow up system built in it so as to continuously shut it off when the pressure of the motive fluid responds to movements of the finger operative member. Certain features of my invention relate to this combination operating and follow up valve by itself.

To insure positive application of the brakes and clutch with sufficient force and to make the device completely an attachment for present day vehicles, I preferably so construct my device that it may be attached to the respective foot pedals for operating each respective control mechanism whether it comprise a brake or a clutch, and in order to get greater leverage I connect the motive means to the effective leverage extremity of said respective pedal and to secure a substantial amount of power for said positive actuation I preferably employ a piston cylinder type of motor of standard type. In order to have this motor of as small size as possible, I preferably use a motor in which the piston is positively driven by changes in differential pressure on opposite sides thereof in both directions, thereby eliminating any piston retraction spring which would have to be so large to be effective as to take up more room than is conveniently present. To secure a prompt reversing of power on opposite movements of the finger controlled member I preferably employ a fluid pressure operated reversing valve which is immediately effective to reverse the flow from the source of supply of fluid pressure by by-passing the master valve line thereto to secure an opposite flow from that obtained by flow through the master valve on actuation thereof, when the finger controlled member is completely released. However, if the finger controlled member is only partially released the flow is not entirely by-passed but a sufficient amount flows back through the master valve to permit a step by step release as well as a graduated or step by step application. I believe that I am the first, therefore, to provide the combination of such a master valve, a motor cylinder and a fluid flow reversing valve.

A further feature of my invention resides in the structure of the reversing valve itself.

A further object of my invention is to provide a "feel" device in such a combination in which the "feel" is reduced to a finger resistant amount in the manner previously explained.

A further object of my invention relates to the means I employ to transmit movements of the finger operated control member normally on the gear shift lever to the actuating portion of the master valve and for this purpose I preferably employ a movable liquid column thereby greatly ducing the friction in the transmission of power.

A further feature of my invention relates to the structure of the means I preferably employ to connect the motive cylinder piston rod to the brake pedal, which permits both the finger control of my invention and the normal actuation of the automobile by the medium of the leg actuated foot pedal.

These and such other objects of my invention as may hereinafter appear will be best understood from a description of the accompanying drawings, which illustrate embodiments thereof.

In the drawings.

Fig. 1a is a diagrammatic plan view showing the operating parts of my invention diagrammatically illustrated in Fig. 1.

Figs. 2 to 5 are diagrammatic views partially shown in elevation and partially shown in section of the component parts of my invention attached respectively to the gear shift lever and a control means whether it comprises the brake or clutch pedal, Fig. 2 showing the device in neutral position, Fig. 3 showing the device in brake applying position, Fig. 4 showing the device in brake applied position, and Fig. 5 showing the device in brake releasing position.

In the drawings, wherein like characters of reference generally indicate like parts throughout, 10 generally indicates a motor driven vehicle having my invention attached. Said automobile has the usual standard parts, such as the wheels 12, steering post 14, steering wheel 16, gear shift lever 18, clutch pedal 20, clutch 21, brake pedal 22, brake cylinder 24, brake cylinder piston 26, brake cylinder piston rod 28, and pipe lines 30 connected to the respective individual fluid motors 32 for applying the respective brakes 33 to the wheels 12. The clutch pedal 20 is connected to the clutch 21 by the tie rod 34 and clutch fork 36 as usual.

In accordance with my invention, I provide motive means 38, such as a supplemental booster or servomotor 38 for actuating the braking means 33 to apply the brakes, in the embodiment shown, through the medium of the usual fluid system 40 including the master cylinder 24, the flexible pipes 30 and the individual brake cylinders 32, said master cylinder 24 having a piston 26 moved by the connecting rod 28 actuated by the foot pedal 22 operatively connected to the motive means 38 to be respectively lowered and raised thereby having a finger operating member 42 movably mounted preferably on the gear shift lever 18 for controlling the braking means motive means 38, motive means 44 for moving the clutch 21 back and forth from operative to inoperative positions and a second finger operative member 46 also movably mounted also preferably on the gear shift lever 18 for controlling the clutch means motive means 44 whereby one hand may actuate the gear shift lever 18 and fingers of said hand operate the respective finger operable members 42 and 46 to operate the braking means 33 and the clutch 21. In my preferred embodiment the motive means for operating both the braking means and clutch means preferably comprises a reversible fluid pressure operated motor 38 or 44.

As stated, in both embodiments I employ follow up means to shut off respective motive means after the brakes have been applied and the clutch moved in response to movements of the respective finger operated members 42 and 46.

As stated previously, my invention includes in a control system for a motor driven vehicle for use by a leg cripple, wheel braking means 33, clutch means 21 for operatively connecting the power to the wheels 12 and a source of fluid pressure supply 50. In the embodiment shown in Figs. 1 to 5 the source of fluid pressure supply comprises a source of vacuum, such as the intake manifold of the engine of the vehicle to be driven employing in this instance a vacuum to suck the piston back and forth produced by the intake manifold with the piston 76 of the respective motive means 38 or 44 urged forwardly by atmospheric air taken in by the air filter 54. In the embodiment shown in Fig. 6 however, I employ a closed system whereby the source of fluid pressure supply is the reservoir 56 and circulating pump 58. In all embodiments shown the fluid pressure operating means for a control system for operating the brakes are the same as the fluid pressure operated means for the control system for operating the clutch, although in the drawings I have designated a separate motive means 38 for operating the braking means from that 44 employed for that for actuating the clutch. The motive system, however, is identical whether employed for actuating the brakes or the clutch with the exception that the feel device 60 is desirable for the motive means 38 for actuating the brakes while it is unnecessary for use in the motive means for actuating the clutch. Each system includes a motive means 38 or 44, and valve means 62 for controlling the operation of the motive means; said valve means including, in the embodiment shown, a master valve 64 and an automatic reversing valve 66. The master control valve 64, reversing valve 66 and the cylinder 38 of motive means are suitably connected together in the manner to be explained by suitable pipes and the "feel" device 60 is connected to said pipes to be responsive to the fluid pressure in the fluid system in a manner to be explained. As stated, I provide an identical system for actuating the clutch 21 through the clutch pedal 20, comprising fluid pressure operated means for moving the clutch means back and forth from inoperative to operative positions and valve means for controlling operation of the motive means. As stated hitherto, I provide a movably mounted finger operated member 42 for controlling the brake means motive means 38 through the valve means 62 and a second movably mounted finger operable member 46 for controlling the clutch means motive means 44 through a similar valve means 62. In either embodiment I provide a line 68 connecting the source of fluid pressure supply 50 or 56 with the braking means motive means having a check valve 70 therein and a line 72 connecting the source of fluid pressure supply whether it comprise the intake manifold 50 or reservoir 56 and pump 58 with the clutch means motive means 44 having a check valve 74 therein.

The follow up means 48 for operating either the brake or the clutch motive means 38 or 44 is also preferably fluid controlled and is preferably formed as part of the master control valve 64 and is responsive to the pressure in the motive fluid. It is also apparent that the finger operable control members 42 and 46, while preferably mounted on the gear shift lever 18 may be mounted in any suitable, convenient place adjacent the steering wheel or otherwise.

Figure 5:
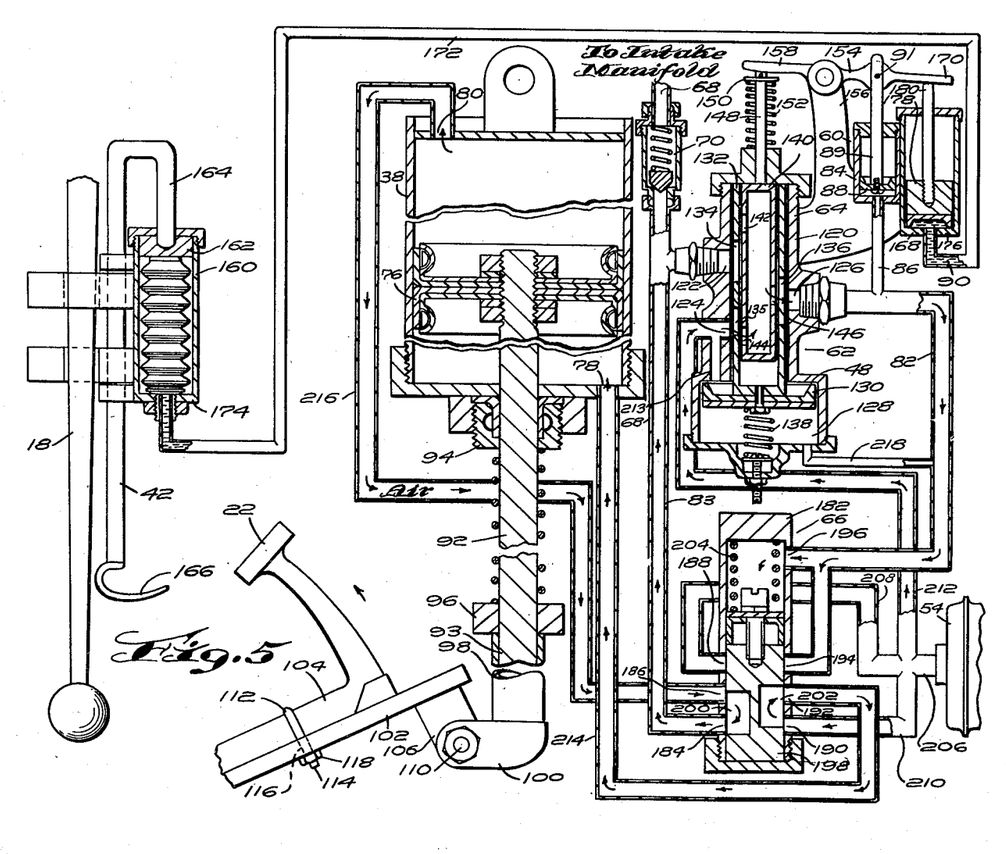
Figure 6:
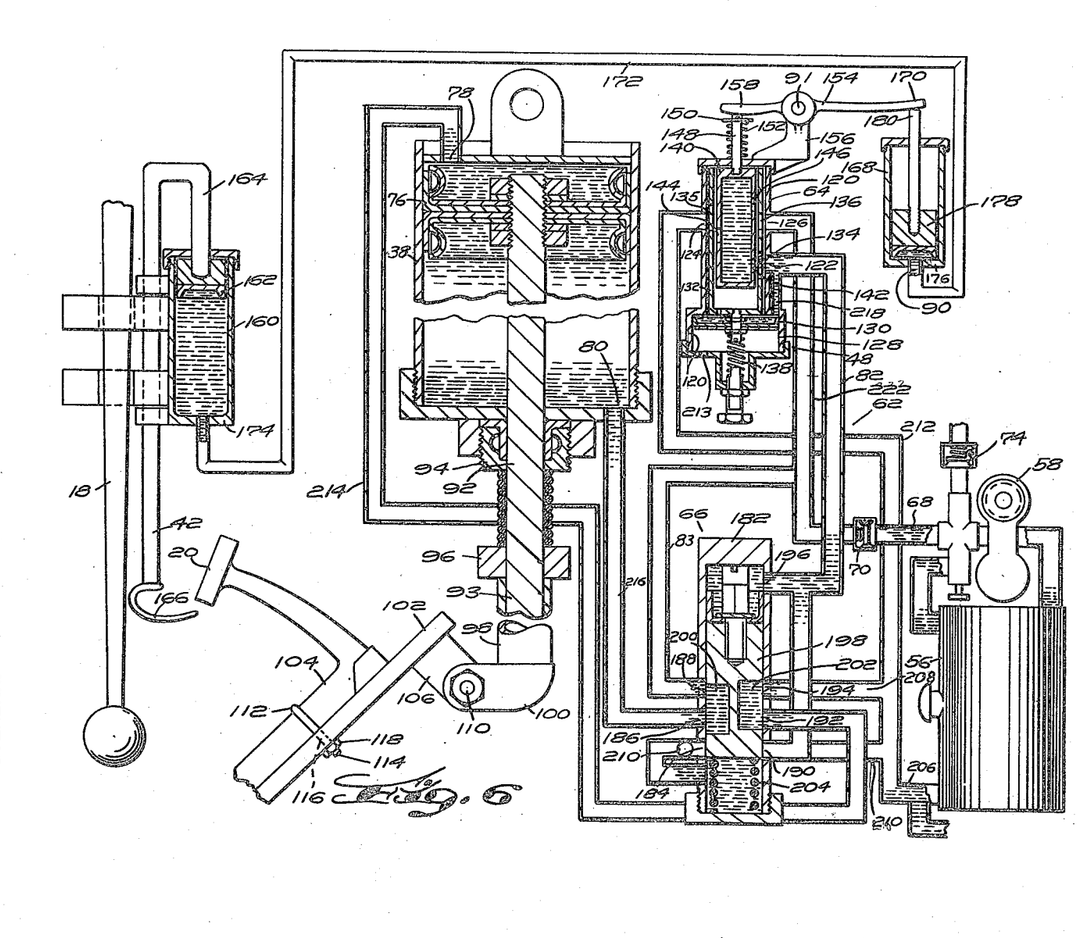
Fig. 6 is a diagrammatic view partially shown in elevation and partially shown in section of an alternative embodiment of my invention employing a closed liquid system including a reservoir and pump.
Figure 9:
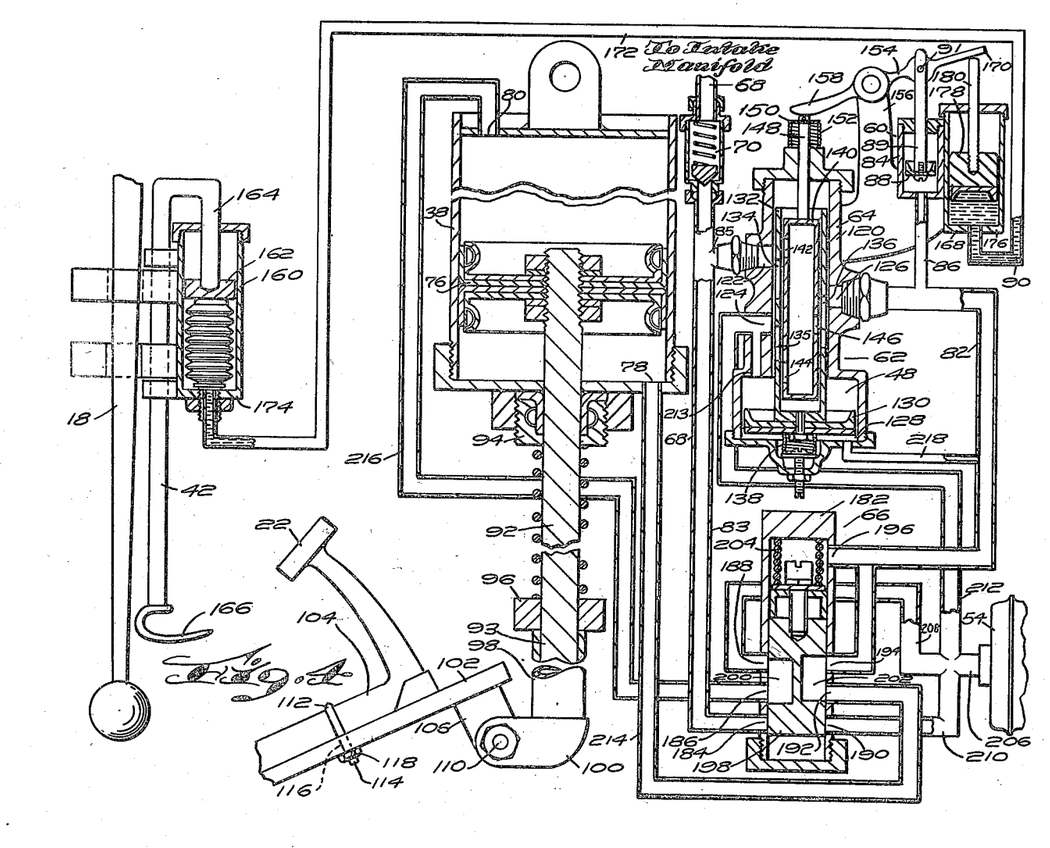
Figure 10:
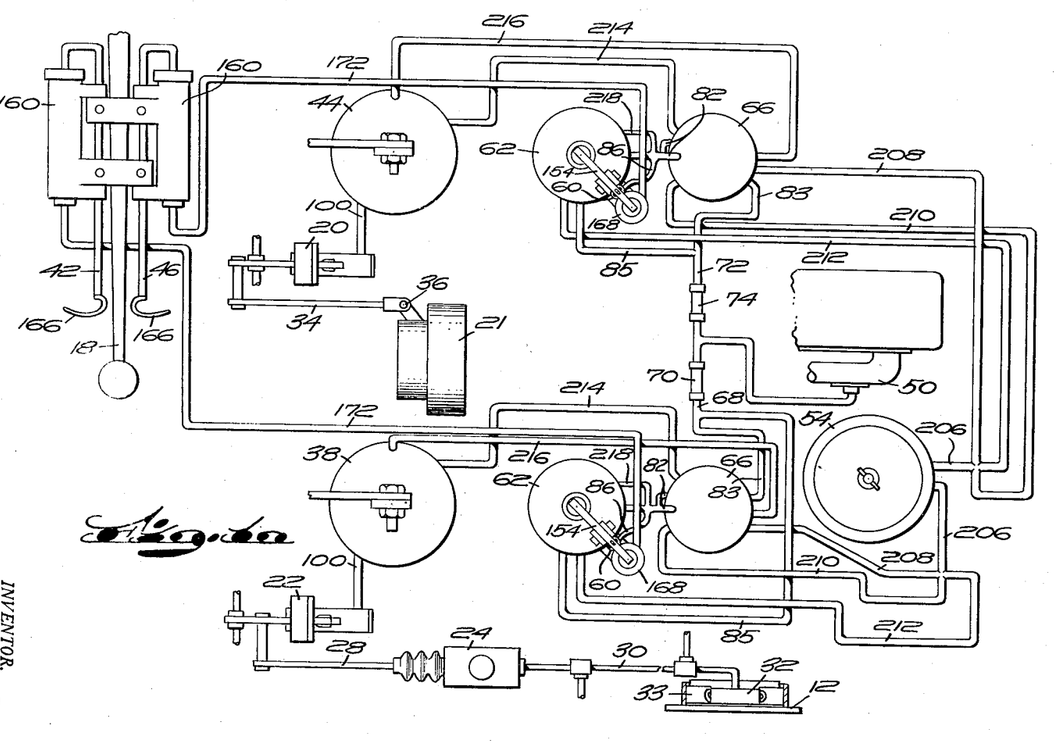

Thus my improved control system for a motor driven vehicle for use by a leg cripple has wheel braking means 33 and clutch means 21 for operatively connecting the power to the wheels and fluid pressure supply means whether it comprises the intake manifold 50 aided by the air filter 54 or the liquid reservoir 56 aided by the liquid pump 58 and includes a finger operable control system for the wheel braking means identical with the finger operative control system employed for the clutch; each system therefore comprises a motive cylinder 38 or 44 having a fluid operated double action piston 76 for actuating either the braking means 33 or the clutch 21 having a piston advancing port 78 at one end thereof and a piston retracting port 80 at the opposite end thereof, a line 82 connected to the fluid pressure supply means in the embodiment shown in Figs. 1 to 5 the intake manifold 50 and, in the embodiment shown in Fig. 6, the pump 58, having a control valve, namely the master valve 64 therein, a movably mounted finger operable means 42 or 46 for actuating said control valve 64, a fluid pressure operated flow directional reversing valve 66 automatically connectable by the flow through a power advancing line from said control valve line 82 to the piston advancing port 78 of the motor cylinder 38 or 44 and a discharge line from the piston retracting port 80 of the motive cylinder 38 or 44 to the fluid pressure supply means in the embodiment shown in Figs. 1 to 5 the air filter 54 and in the embodiment shown in Fig. 6 the liquid reservoir 56 when the control valve is open and automatically connectable directly through a power advancing line from the fluid pressure supply means, namely in the embodiment shown in Figs. 1 to 5 the intake manifold 50 and in the embodiment shown in Fig. 6 the pump 58, to the piston retracting port 80 of the motive cylinder 38 or 44 and through a discharge line from the piston advancing port of the motor cylinder to the fluid pressure supply means in the embodiment shown in Figs. 1 to 5 the air filter 54 and the embodiment shown in Fig. 6 the fluid reservoir 56 when the control valve 64 is shut. I also provide a follow up valve 48 in said control valve 64 responsive to pressure in said line 82 for shutting off said line and master valve 64 after the pressure in said line 68 has responded to movements of said finger operable member 42 or 46 and cylinder piston 76, and expansible "feel" means 60 connected to said control valve line 82 and to said finger operable member 42 or 46 responsive to pressure in said line 82 reduced to a finger resistant amount opposing forward movement of said operating member. Where a fluid control system, including the reversible motor 38 for the brake or the reversible motor 44 for the clutch be both employed, as stated, check valve means 70 are provided in one line and check valve means 74 are provided in the other line. The "feel" means 60 hithertofore referred to comprises the cylinder 84 connected by the pipe 86 to the master valve control line 82 or any other portion of the fluid system. It will be noted that I am enabled to reduce the pressure in the feel means 60 opposing the movement of said finger operable member 42 to a finger resistant amount by making the diameter or area of the piston 88 of said cylinder 84 many times smaller than the diameter or area of the power piston 76, in the embodiment shown being at least 30 times smaller in area, in practice about 35 times smaller. In practice the operating cylinder piston 76 has an area of approximately .4 inches and I make the diameter of my "feel" piston 88 approximately ¾ inch making the area thereof approximately 35 times smaller than that of the main operating piston 76. To actuate the master control valve 64 I preferably employ a liquid column 90 extending from said finger control member 42 or 46 to the movable member of the master control valve 64.

Figs. 2 to 5 show the parts of an embodiment of my invention employing an open vacuum system and Fig. 6 shows the parts of my invention as applied to a closed liquid system. The parts of my invention are identical with the exception that they have to be connected up differently as power is applied from the opposite sides.

Figure 1:
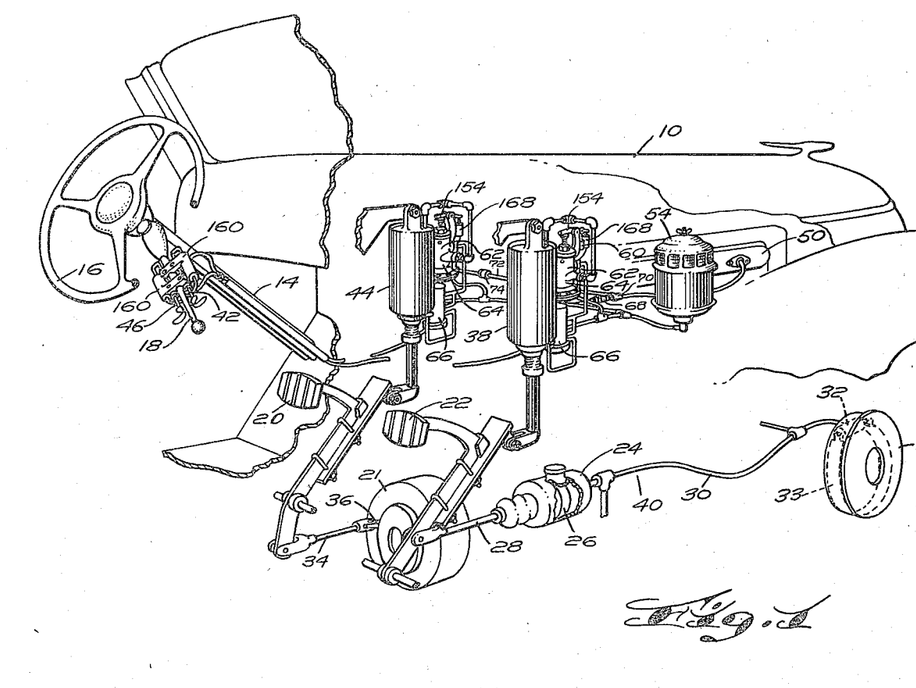
Fig. 1 is a diagrammatic perspective view of center portions of an automobile, broken away to show the operating parts of my invention, namely, my attachment for controlling the brake pedal, my attachment for controlling the clutch pedal and the finger operated attachments for controlling said respective attachments mounted on the gear shift lever of an automobile.
Figure 2:
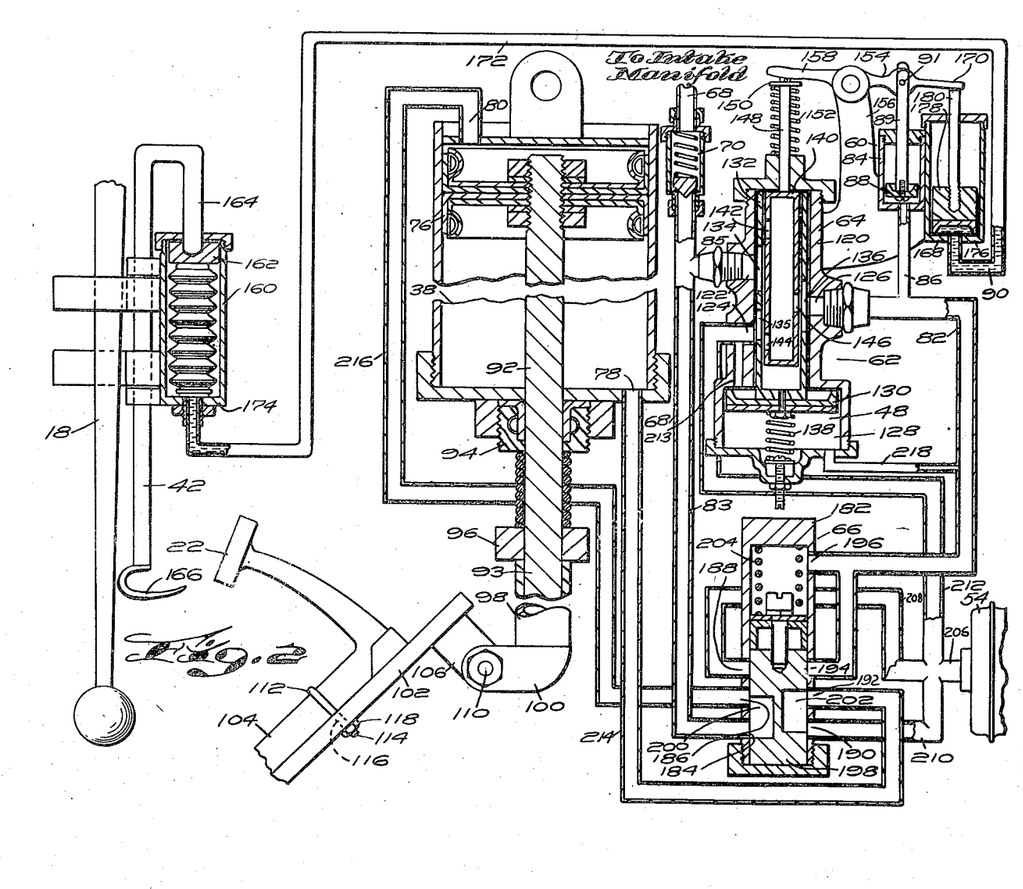
Figure 3:
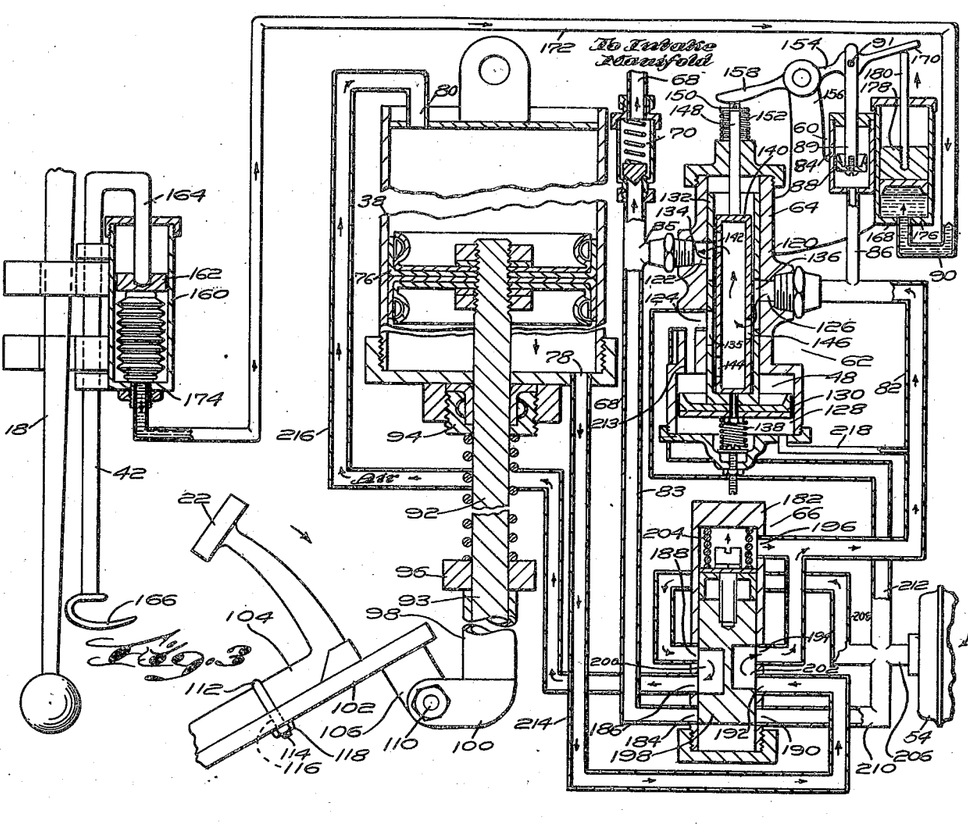

As stated, Figs. 2 to 5 show the various positions of the parts of the vacuum operated embodiment of my invention in use, Fig. 2 showing the parts in neutral position, Fig. 3 showing the parts in brake applying position, Fig. 4 showing the brakes in brake applied position and Fig.

5 showing the parts in brake releasing position. For the detailed description of the parts I will merely describe the operation of one control system whether it be employed for controlling the brakes or controlling the clutch. In both instances, as explained, I employ a preferably vertically mounted operating cylinder 38 having a piston advancing port at one end thereof in the embodiment shown in Figs. 2 to 5 the lower port 78 and in the embodiment shown in Fig. 6 the upper port 78 and a piston retracting port at the other end thereof in the embodiment shown in Figs. 2 to 5 the upper port 80 and the embodiment shown in Fig. 6 the lower port 80 and a piston 76 reciprocal preferably vertically in the cylinder having a downwardly projecting piston rod 92. As stated, the cylinder 38 is preferably double action to positively move the piston 76 in either direction and the ends of the cylinder therefore are under pressure. In both embodiments for this reason the piston rod 92 projects downwardly through a suitable stuffing box 94 in the lower end of the cylinder 38.

The lower end of the piston rod 92 is operatively connected to its respective pedal in the embodiment shown to the brake pedal 22, although it may be connected to the clutch pedal 20 where a duplicate apparatus is employed. So that the pedal may be depressed by the usual operation thereof independently of my attachment, the lower end 93 of the piston rod 92 is smooth and has a collar 96 secured thereto. I provide a sleeve 98 slidably mounted on the lower end of the piston rod 92 for slidably receiving the smooth lower end 93 of the piston rod 92. Said sleeve 98 has an arm 100 projecting rearwardly therefrom. I provide a plate 102 adapted to underlie the brake pedal 22 or clutch pedal 20 preferably the portion 104 projecting upwardly from the pivot rod thereof having an arm 106 projecting downwardly from the extremity of the upper end thereof pivotally mounted by the pivot rod 110 on said arm 100 projecting rearwardly from said sleeve 98 and suitable means, such as the clamps 112 comprising U-shaped members overlying the brake lever portion 104 and having the ends 114 pass through suitable holes 116 near the lower end of said plate 102 and clamped thereto by the nuts 118. With this construction it is obvious that the depression of the foot pedal 22 will merely draw the sleeve 98 downwardly away from the collar 96 on the lower end of the rod 92 but that when my invention is employed for lowering the brake pedal that the downward movement of the rod 92 will force the collar 96 against the upper end of the sleeve 98 and the lower end of the rod 92 against the arm 100 to cause depression of the plate 102 to depress the foot pedal 22.

As stated hitherto, I also employ a master actuating and follow up valve 64 in the line 82 leading from the source of supply 50 or 56. In the embodiment shown, said master valve comprises a cylindrical casing 120 mounted adjacent said cylinder 38 having a discharge port 122, in the embodiment shown in Figs. 2 to 5 a vacuum discharge port 122 and in the embodiment shown in Fig. 6, a liquid discharge port 122, a pressure relief port 124, in the embodiment shown in Figs. 2 to 5 an air inlet port 124, in the embodiment shown in Fig. 6, a relief port 124 and an inlet port 126, in the embodiment shown in Figs. 2 to 5, a vacuum inlet port and in the embodiment shown in Fig. 6, a liquid inlet port and a portion 128 of larger bore below said ports. As an automatic follow up device, I provide a piston 130 reciprocal in said enlarged portion and a sleeve 132 reciprocal in nested relationship in the upper portion of said casing having a cooperating discharge port 134, in the embodiment shown in Figs. 2 to 5 a vacuum discharge port and in the embodiment shown in Fig. 6 a liquid discharge port, a pressure relief port 135, in the embodiment shown in Figs. 1 to 5, an air inlet port, in the embodiment shown in Fig. 6 a relief port and an inlet port 136, in the embodiment shown in Figs. 1 to 5 a vacuum inlet port and in the embodiment shown in Fig. 6 a liquid inlet port, normally opposite said casing ports 122, 124 and 126 respectively when in operative position and spring means 138 in said enlarged portion normally urging said piston 130 and sleeve 132 upwardly to inoperative position. As the actuating or controlling portion of said master valve, I preferably employ a hollow piston 140 reciprocal in nested relationship within said sleeve 132 having cooperating discharge, pressure relief and inlet ports 142, 144 and 146 respectively, one of said flow ports being out of alignment with its aligned sleeve and casing ports when in inoperative position, in the embodiment shown in Figs. 2 to 5, the vacuum discharge port 142 and in the embodiment shown in Fig. 6 the inlet port 146. I provide a piston rod 148 projecting upwardly from said hollow piston 140 having an enlargement, such as the washer 150 at the upper end thereof and spring means 152 interposed between said casing 120 and enlargement 150 to normally urge said hollow piston 140 to its upper inoperative position. As means to actuate said hollow piston, which, as stated, is the controlling member of the master valve 64 by the finger actuated member 42, I provide a lever 154 pivotally mounted on an extension 156 from said casing 120 having a work arm 158 abutting the upper end of said piston rod 148.

For actuating the power arm 170 of said lever, I provide a closed liquid system having a movable liquid column 90 for actuating said hollow piston 140 comprising a cylinder 160 mounted on the gear shift lever 18 having a piston 162 either of bellows type as shown in Figs. 2 to 5 or of standard type as shown in Fig. 6 movable therein having a piston rod 164 projecting through an end of said cylinder, in the embodiment shown being bent inwardly and outwardly to form the finger actuated member 42 and being provided at its outer end with the finger grip or handle 166. I also provide a cylinder 168 mounted below the lever power arm 170 and I provide a liquid line 172 connecting the closed ends 174 and 176 of said gear shift lever cylinder 160 and lever work arm cylinder 168 having the operating fluid 90 movable back and forth through said line 172 from one cylinder 160 to the other cylinder 168 and a piston 178 vertically reciprocal in said lever cylinder 168 having a piston rod 180 projecting upwardly to abut the power arm 170 of the hollow piston operating lever 154.

To avoid any retraction spring to retract the piston 76 of the operating cylinder, I provide an operating cylinder having a piston 76 positively movable in either direction and as means for reversing the flow to said cylinder 38 I provide fluid pressure operated fluid flow reversing valve 66 mounted adjacent said master valve 64. Said valve 66 comprises a hollow cylinder 182 having substantially in alignment one above the other a discharge port 184, in the embodiment shown in Figs. 2 to 5 a vacuum discharge port and in the embodiment shown in Fig. 6 a liquid discharge port, a port 186 for connection to the piston retracting port 80 of the operating cylinder 38 and a power port 188 in the embodiment shown in Figs. 2 to 5 a vacuum port and in the embodiment shown in Fig. 6 a liquid inlet port and at a spaced radial distance therefrom substantially in alignment one above the other, a power port 190 in the embodiment shown in Figs. 2 to 5 an air inlet port, in the embodiment shown in Fig. 6 a liquid inlet port, a port 192 for connection to the piston advancing port 78 of the operating cylinder 38, a discharge port 194, in the embodiment shown in Figs. 2 to 5 a vacuum discharge port, in the embodiment shown in Fig. 6, a liquid discharge port and a port 196 for operating the piston 198 thereof, an elongated piston 198 vertically reciprocal in said cylinder having an axial slot 200 movable from a position connecting the air inlet port 188 to the port 186 for connection to the piston retracting port 80 of the operating cylinder on actuating movement of said finger actuated member for downward movement of said operating cylinder piston 76 to a position on shutting of said master valve 64 connecting said piston retracting port 186 of the operating cylinder with the discharge port 184 for the upward movement of said operating cylinder piston and at a cooperating spaced radial distance therefrom with an elongated axial slot 202 movable from a position connecting the port 192 for connection to the piston advancing port 78 of the operating cylinder with the discharge port 194 for the downward movement of said cylinder piston 76 on an actuating movement of said finger actuated member 42 to a position on shutting of said master valve connecting the power inlet port 190 with the port 192 for connection to the piston advancing port 78 of the operating cylinder 76 for upward movement of said operating cylinder piston 76. I also provide a spring means 204 urging said elongated piston 198 to its piston retracting position movable by the flow against the pressure of said spring means to its piston advancing position, in the embodiment shown in Figs. 2 to 5 being compressed by the vacuum and hence being in the upper portion of the cylinder and in the embodiment shown in Fig. 6 being compressed by the flow and hence being shown in the lower portion of the cylinder, and lines connecting the piston advancing and piston retracting ports 78 and 80 on said operating cylinder 76 to their respective ports in the reversing valve, the fluid pressure supply means to the power and discharge ports of the reversing valve and the inlet, pressure relief and discharge ports in the opposite ends of the enlarged cylinder portion 128 of said master valve to said reversing valve 66 and fluid pressure supply means to permit functioning of said valves, one of said valves having a check valve therein adjacent said fluid pressure supply means. In the embodiment shown in Figs. 2 to 5 I therefore provide a line 206 connected to the air filter, which is connected respectively to the air inlet ports 188 and 190 respectively of the reversing valve by the branch pipes 208 and 210 respectively and with a branch pipe 212 connecting said air filter with the air inlet port or pressure relief port 124 of the master control valve 64 having a branch 213 leading to the upper end of the enlarged cylindrical portion 128 of the master valve. I provide a vacuum control line 82 connected to a vacuum discharge port 194 and the piston operating port 196 of said reversing valve and vacuum inlet port 126 of said master valve and a by-pass suction line 83 connecting the other vacuum discharge port 184 of the reversing valve to the intake manifold 50 having the check valve 70 therein adjacent the intake manifold, and a line 85 connecting the vacuum discharge port 122 of the master valve to said line 83, a line 218 connecting the lower end of the enlarged cylindrical portion of the master valve to said control line 82, a line 214 connecting the lower port 78 of the operating cylinder with its port 192 on the reversing valve, and a line 216 connecting the upper port 80 of said operating cylinder with its port 186 on the reversing valve.

In the embodiment shown in Fig. 6, said lines are generally similar. The power line 68 extends from said circulating pump 58 and has the check valve 70 therein adjacent said pump. Said line has a branch 83 extending to the power inlet port 188 of the reversing valve 66 and a branch 222 connected to the inlet port 126 of the master valve 64. A line 82 connects the discharge port 122 of the master valve 64 with a branch 218 extending to the upper end of the enlarged cylindrical portion 128 of said master valve with the other power inlet port 190 and the piston operating port 196 of the reversing valve 66. A line 214 connects the piston advancing port 78 of the operating cylinder 38 to its respective port 192 in the reversing valve 66 and a line 216 connects the piston retracting port 80 of the operating cylinder 38 to its respective port 186 on the reversing valve 66. A line 208 connects one discharge port 194 of the reversing valve to the fluid reservoir 56 and a line 210 connects the other discharge port 184 of the reversing valve 66 to said reservoir 56, and a line 212 connects the pressure relief port 124 of the master valve to said fluid reservoir 56.

The "feel" cylinder 84 has a line 86 connecting the lower end thereof to the master valve control line 82 having a piston 88 reciprocal therein having a piston rod 89 projecting upwardly from said cylinder attached to the power arm 170 of said master valve operating lever 154 as at 91. As stated, hitherto the area of the piston 88 of said feel cylinder 84 is made so small as compared with the area of the piston 76 of the operating cylinder as to reduce the pressure provided by the feel cylinder resistant to the movement of the finger actuated member, to a finger resistant amount.

As stated, Fig. 2 shows the neutral position of the parts with the piston 56 at the top of its cylinder and all parts of the master valve 64 nested together at the top of its casing 120 and the spring 204 urging the reversing valve 66 to its lowermost position. The leg cripple pulls on the finger grip 166 of the finger operating member 42 as diagrammatically illustrated in Fig. 3. This moves the liquid column 90 to depress the operating cylinder of the hollow piston 140 of the master valve 64. The intake manifold 50 then starts to suck fluid from the line 68—85 and through the master valve, through the aligned vacuum discharge ports 122, 134, and 142 thereof through the aligned vacuum inlet ports 126, 136, and 146 through the flow control line 82 and to the vacuum discharge port 194 of the reversing valve, and to the piston operating port 196 to permit the suction to also raise the piston 198 against the pressure of the spring 204 so that it assumes the position in the top of the reversing cylinder as shown in Fig. 3.

As the reversing valve is raised, the suction line is completed from the piston advancing port 78 through the ports 192 and 194 of the reversing valve through the master valve 64 and control line 82 to the intake manifold. At the same time air enters through the air filter, is passed through the ports 188 and 186 of the reversing valve to the upper port 80 of the cylinder so that the atmospheric pressure may aid in pressing the piston 76 downwards. The follow up device 46 functions as usual. As suction gets into the enlarged portion 128 of the master valve through the line 210 to 82 it sucks the follow up piston downwardly until the sleeve 132 shuts off its follow up ports in the master valve. The "feel" cylinder 84 resists the finger advancing movement of the finger operated member 42.

Fig. 4 shows the ports in the brake applied position with the follow up operating to shut off the device.

Fig. 5 illustrates the position the parts assume in releasing the brakes. Either the finger operative member 42 is released entirely when the by-pass line 83 directly connected to the intake manifold 50 will function to rapidly raise the cylinder upwardly as shown, suction flowing from the line 83 to the piston retracting port 80, and air pressure being inserted through the line 206, port 190, port 192 to the piston retracting port 78 of the cylinder to assist in moving it upwardly. As will be seen by the arrows, a step by step release of the control valve is possible as the master valve 64 is not entirely shut off.

The operation of the device shown in Fig. 6 is identically similar to that shown in Figs. 2 to 5 with the exception that the parts are in reverse. The pump 58 positively pumps pressure through the line 68, the reversing valve functioning in an exactly opposite manner to cause liquid pressure to flow through the port 78 to advance the cylinder 76 on the down stroke and vice versa through the port 80 on the up stroke, the follow up device 48 and valves reversing as in the other embodiment only in different directions.

It is apparent therefore that I have provided a novel type of fluid control for motor vehicles with the advantages explained above.

It is understood that my invention is not limited to the specific embodiments shown and that various deviations thereof may be made without departing from the spirit and scope of the appended claims.

What I claim is:

1. In a control system for a motor driven vehicle for use by a leg cripple, having wheel braking means, clutch means for operatively connecting the power to the wheels, and fluid pressure supply means; a finger operative control system for the wheel braking means, comprising a motive cylinder having a fluid pressure operated piston for actuating the braking means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston, expansible feel means connected to said control valve line and operatively connected to said finger operable member responsive to pressure in said line reduced to a finger resistant amount opposing forward movement of said operating member and check valve means adjacent the source of fluid pressure supply in the said control valve line, and a finger operated control system for the clutch means comprising a motive cylinder having a fluid pressure operated piston for actuating the clutch means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston, and check valve means adjacent the source of fluid pressure supply in the said control valve line.

2. In a control system for a motor driven vehicle for use by a leg cripple, having wheel braking means, clutch means for operatively connecting the power to the wheels, and fluid pressure supply means; a finger operative control system for the wheel braking means, comprising a motive cylinder having a fluid pressure operated piston for actuating the braking means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston, expansible feel means connected to said control valve line and operatively connected to said finger operable member responsive to pressure in said line including a piston having an area at least 30 times smaller than that of said operating piston to reduce the pressure in said line opposing forward movement of said finger operating member, a finger resistant amount and check valve means adjacent the source of fluid pressure supply in the said control valve line, and a finger operated control system for the clutch means comprising a motive cylinder having a fluid pressure operated piston for actuating the clutch means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston, and check valve means adjacent the source of fluid pressure supply in the said control valve line.

3. In a control system for a motor driven vehicle for use by a leg cripple, having wheel braking means, clutch means for operatively connecting the power to the wheels, and fluid pressure supply means; a finger operative control system for the wheel braking means, comprising a motive cylinder having a fluid pressure operated piston for actuating the braking means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston, and check valve means adjacent the source of fluid pressure supply in the said control valve line and a finger operated control system for the clutch means comprising a motive cylinder having a fluid pressure operated piston for actuating the clutch means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston, and check valve means adjacent the source of fluid pressure supply in the said control valve line.

4. In a control system for a motor driven vehicle for use by a leg cripple, having vehicle control means, and fluid pressure supply means; a finger operative control system for the vehicle control means, comprising a motive cylinder having a fluid pressure operated piston for actuating the vehicle control means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston and expansible feel means connected to said control valve line and operatively connected to said finger operable member responsive to pressure in said line reduced to a finger resistant amount opposing forward movement of said operating member.

5. In a control system for a motor driven vehicle for use by a leg cripple, having vehicle control means, and fluid pressure supply means; a finger operative control system for the vehicle control means, comprising a motive cylinder having a fluid pressure operated piston for actuating the vehicle control means having a piston advancing port at one end thereof, and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston and expansible feel means connected to said control valve line and operatively connected to said finger operable member responsive to pressure in said line including a piston having an area at least 30 times smaller than that of said operating piston to reduce the pressure in said line opposing forward movement of said finger operating member a finger resistant amount.

6. In a control system for a motor driven vehicle for use by a leg cripple, having vehicle control means, and fluid pressure supply means; a finger operative control system for the vehicle control means, comprising a motive cylinder having a fluid pressure operated piston for actuating the vehicle control means having a piston advancing port at one end thereof and a piston retracting port at the other end thereof, a line connected to the fluid pressure supply means having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, and a follow up valve in said control valve line responsive to the pressure in said line for shutting off said line after the fluid pressure in said line has responded to movements of said finger operable member and cylinder piston.

7. In a control system for a motor driven vehicle for use by a leg cripple, having vehicle control means, and fluid pressure supply means, a finger operative control system for the vehicle control means, comprising a motive cylinder having a fluid pressure operated piston for actuating the vehicle control means having a piston advancing port at one end thereof and a piston retracting port at the other end thereof, a line connected to the fluid pressure supply means having a control valve therein, a movably mounted finger operable member, a liquid column positively moved by said member for actuating said control valve, a fluid pressure operated flow directional reversing valve automatically connectable by the flow through a power advancing line from said control valve line to the piston advancing port of the motive cylinder and a discharge line from the piston retracting port of the motive cylinder to the fluid pressure supply means when the control valve is open and automatically connectable directly through a power advancing line from the fluid pressure supply means to the piston retracting port of the motive cylinder and through a discharge line from the piston advancing port of the motive cylinder to the fluid pressure supply means when the control valve is shut, a follow up valve in said control valve line responsive to the pressure in said line for shutting off said line after the fluid pressure in said line has responded to movements of said finger operable member and cylinder piston, and expansible feel means connected to said control valve line and operatively connected to said finger operable member responsive to pressure in said line reduced to a finger resistant amount opposing forward movement of said operating member.

8. In a control system for a motor driven vehicle for use by a leg cripple, having wheel braking means, clutch means for operatively connecting the power to the wheels, and a source of vacuum supply comprising the vehicle motor intake manifold; a source of air supply comprising an air filter, a finger operative control system for the wheel braking means, comprising a motive cylinder having a fluid pressure operated piston for actuating the braking means having a piston advancing port at one end thereof and a piston retracting port at the other end thereof, a line connected to said intake manifold having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to said air filter when the control valve is open and automatically connectable directly through a power advancing line from the intake manifold to the piston retracting port of the motive cylinder and through a discharge line from the piston advancing port of the motive cylinder to said air filter, when the control valve is shut, a follow up valve in said control valve line responsive to the pressure in said line for shutting off said line after the fluid pressure in said line has responded to movements of said finger operable member and cylinder piston; and check valve means adjacent the intake manifold in the said control valve line and a finger operated control system for the clutch means comprising a motive cylinder having a fluid operated piston for actuating the clutch means having a piston advancing port at one end thereof and a piston retracting port at the other end thereof, a line connected to said intake manifold having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to said air filter when the control valve is open and automatically connectable directly through a power advancing line from said intake manifold to the piston retracting port of the motive cylinder and through a discharge line from the piston advancing port of the motive cylinder to said air filter when the control valve is shut, a follow up valve in said control valve line responsive to the pressure in said line for shutting off said line after the fluid pressure in said line has responded to movements of said finger operable member and cylinder piston, and check valve means adjacent said intake manifold in the said control valve line.

9. In a control system for a motor driven vehicle for use by a leg cripple, having vehicle control means, and a source of vacuum supply comprising the vehicle motor intake manifold; a source of air supply comprising an air filter, a finger operative control system for the vehicle control means, comprising a motive cylinder having a fluid pressure operated piston for actuating the vehicle control means having a piston advancing port at one end thereof and a piston retracting port at the other end thereof, a line connected to said intake manifold having a control valve therein, a movably mounted finger operable member for controlling the actuation of said control valve, a fluid pressure operated flow directional reversing valve automatically connectable by the flow through a power advancing line from said control valve line to the piston advancing port of the motive cylinder and a discharge line from the piston retracting port of the motive cylinder to said air filter when the control valve is open and automatically connectable directly through a power advancing line from said intake manifold to the piston retracting port of the motive cylinder and through a discharge line from the piston advancing port of the motive cylinder to said air filter when the control valve is shut, and a follow up valve in said control valve line responsive to the pressure in said line for shutting off said line after the fluid pressure in said line has responded to movements of said finger operable member and cylinder piston.

10. In a control system for a motor driven vehicle for use by a leg cripple, having vehicle braking means, a foot control pedal and fluid pressure supply means; an operating cylinder having upper and lower ports and a piston reciprocal therein having a downwardly projecting piston rod, a sleeve slidably mounted on the lower end of said piston rod having an arm projecting rearwardly therefrom, a plate adapted to underlie the foot control pedal having an arm projecting downwardly from the upper end thereof pivotably mounted on said arm projecting rearwardly from said sleeve and means clamping said control pedal to said plate, a master actuating and follow up valve comprising a cylindrical casing mounted adjacent said cylinder having a vacuum discharge port and an air inlet port on one side thereof and a vacuum inlet port on the opposite side thereof and a portion of larger bore below said ports, a piston reciprocal in said enlarged portion, a sleeve vertically reciprocal in nested relationship in the upper portion of said casing having cooperating vacuum exhaust, air inlet and vacuum inlet ports opposite said casing ports when in inoperative position and spring means in said enlarged portion normally urging said piston and sleeve upwardly to inoperative position, a hollow piston vertically reciprocal in nested relationship within said sleeve having a vacuum inlet port aligned with said sleeve and casing vacuum inlet ports when in inoperative position and a vacuum discharge port normally above said aligned sleeve and casing vacuum discharge ports when in inoperative position and an air inlet port normally aligned with aligned sleeve and casing air inlet ports in inoperative position, a piston rod projecting upwardly from said hollow piston having an enlargement at the upper end thereof and spring means interposed between said casing and enlargement to normally urge said hollow piston to its upper inoperative position, a lever pivotably mounted on an extension from said casing having a work arm abutting the upper end of said piston rod, a closed liquid system having a movable liquid column for actuating said hollow piston comprising a cylinder mounted on the gear shift lever having a piston movable therein and a finger operative member for moving said piston projecting from said cylinder and having a finger operative handle, a cylinder mounted below said lever power arm, a fluid line connecting the closed ends of said gear shift lever cylinder and lever work arm cylinder and a piston vertically reciprocal in said lever cylinder having a piston rod projecting upwardly to abut the power arm of said hollow piston operating lever, a fluid pressure operated fluid flow reversing valve mounted adjacent said master valve comprising a hollow cylinder having substantially in alignment one above the other, a vacuum port, a port for connection to the upper port of the operating cylinder, and an air inlet port and at a spaced radial distance therefrom substantially in vertical alignment one above the other, an air inlet port, a port for connection to the lower port of the operating cylinder, a vacuum discharge port for connection to the master valve casing vacuum inlet port and a piston operating port, an elongated piston vertically reciprocal in said cylinder having an axial slot therein movable from an upper position connecting said air inlet port to the port for connection to the upper port of the operatig cylinder on actuating movement of said finger operated member for downward movement of said operating cylinder piston, to a lower position connecting said operating cylinder port to the said vacuum port for the upward movement of said operating cylinder piston and with an elongated axial slot movable from an upper position connecting the port for connection to the lower port of the operating cylinder with the port for connection to the lower port of the operating cylinder with the port for connection to the vacuum inlet port of said master valve for the downward movement of said operating cylinder piston on an actuating movement of said finger operative member, to a lower position connecting the air inlet port with the port for connection with the lower port of the operating cylinder for upward movement of said operating cylinder piston, spring means normally urging said elongated piston to its downmost position movable by the vacuum to its raised position against the pressure of said spring means, an air filter, lines connecting said air filter with the air inlet ports of said reversing valve and the inlet port of said master valve, and the upper portion of the lower enlarged portion of the master valve, a line connecting the lower port of the operating cylinder with its port on the reversing valve, a line connecting the upper port of the operating cylinder with its port on the reversing valve, a suction line connecting a vacuum discharge port of the reversing valve and suction valve port of the reversing valve to the vacuum inlet port of the master valve, and a line connecting the enlarged cylindrical portion of the master valve to said line, a by-pass suction line connecting a vacuum discharge port of the reversing valve to the intake manifold having a check valve therein adjacent the intake manifold, and a line connecting the vacuum discharge port of the master valve to said line, and a feel cylinder having a line connecting the lower end thereof to said master valve inlet line having a piston reciprocal therein having a piston rod projecting upwardly from said cylinder attached to the power arm of said master valve operating lever.

11. In a control system for a motor driven vehicle for use by a leg cripple, having vehicle control means, and fluid pressure supply means; an operating cylinder having upper and lower ports and a piston reciprocal therein having a downwardly projecting piston rod for actuating said vehicle control means, a finger controlled master actuating and follow up valve, a finger operative member for said valve, a closed liquid system having a movable liquid column moved by said finger operative member for actuating said master valve, and a fluid pressure operated fluid flow reversing valve mounted adjacent said master valve operatively connected to said fluid pressure supply means, said master valve, and said operating cylinder ports.

12. In a control system for a motor driven vehicle for use by a leg cripple, having vehicle control means; finger controlled actuating means for said control means, a rod movable by said actuating means, a sleeve enclosing the lower end of said rod having a closed end movable by said rod, having an arm projecting therefrom, a plate adapted to underlie the foot control pedal having an arm projecting downwardly from the upper end thereof pivotably mounted on said arm projecting from said sleeve and means for clamping said control pedal to said plate.

13. In a control system for a motor driven vehicle for use by a leg cripple, having a foot pedal; vehicle control means, finger controlled actuating means for said control means, a rod movable by said actuating means, and a sleeve enclosing the lower end of said rod having a closed end movable by said rod operatively connected to said foot pedal whereby said foot pedal may be directly actuated by the foot pedal or directly actuated by said finger controlled actuating means.

14. In a control system for a motor driven vehicle for use by a leg cripple, having vehicle control means, and a source of fluid pressure supply; an operating cylinder having a piston reciprocal therein having a downwardly projecting piston rod operatively connected to said vehicle control means, a finger controlled master actuating valve, a pivotally mounted operating lever having a work arm for actuating said valve and a power arm, a closed liquid system having a movable liquid column for actuating said master valve comprising a cylinder having a piston movable therein and a finger operative member for moving said piston projecting from said cylinder and having a finger operative handle, a cylinder mounted below said lever power arm, a fluid line connecting the closed ends of said finger actuated cylinder and lever work arm cylinder and a piston vertically reciprocal in said lever work arm cylinder having a piston rod projecting upwardly to abut the power arm of said master valve operating lever.

15. In a control system for a motor driven vehicle for use by a leg cripple, having vehicle control means, and fluid pressure supply means; an operating cylinder having upper and lower ports and a piston reciprocal therein having a downwardly projecting piston rod, operatively connected to said vehicle control means, a line connecting said fluid pressure supply means to said operating cylinder ports having a master actuating and follow up valve therein comprising a cylindrical casing mountable adjacent said cylinder having a vacuum discharge port, an air inlet port and a vacuum inlet port and a portion of larger bore below said ports, a piston reciprocal in said enlarged portion, a sleeve vertically reciprocal in nested relationship in the upper portion of said casing having cooperating vacuum discharge, air inlet and vacuum inlet ports opposite said casing ports when in inoperative position and spring means in said enlarged portion normally urging said piston and sleeve upwardly to inoperative position, a hollow piston vertically reciprocal in nested relationship within said sleeve having a vacuum inlet port aligned within said sleeve and casing vacuum inlet ports when in inoperative position, a vacuum discharge port normally above said aligned sleeve and casing discharge ports when in inoperative position, and an air inlet port normally aligned with said aligned sleeve and casing pressure relief ports, when in inoperative position, a piston rod projecting upwardly from said hollow piston having an enlargement at the upper end thereof and spring means interposed between said casing and enlargement to normally urge said hollow piston to its upper inoperative position, and finger actuated means for lowering said piston rod and attached hollow piston.

16. In a control system for a motor driven vehicle for use by a leg cripple having vehicle control means, and fluid pressure supply means; an operating cylinder having a piston advancing port on one end thereof and a piston retracting port on the other end thereof, and a piston reciprocal therein having a downwardly projecting piston rod operatively connected to said vehicle control means, a line connecting said fluid pressure supply means to said operating cylinder ports having a master actuating and follow up valve therein comprising a cylindrical casing mounted adjacent said cylinder having a discharge port, a pressure relief port and an inlet port and a portion of larger bore below said ports, a piston reciprocal in said enlarged portion, a sleeve vertically reciprocal in nested relationship in the upper portion of said casing having cooperating discharge, pressure relief and inlet ports opposite said casing ports when in inoperative position and spring means in said enlarged portion normally urging said piston and sleeve upwardly to inoperative position, a hollow piston vertically reciprocal in nested relationship within said sleeve having an inlet port, a discharge port and a pressure relief port, one of said flow ports being out of alignment with its corresponding sleeve and casing ports when in inoperative position, a piston rod projecting upwardly from said hollow piston having an enlargement at the upper end thereof and spring means interposed between said casing and enlargement to normally urge said hollow piston to its upper inoperative position, and finger actuated means for lowering said piston rod and attached hollow piston.

17. In a control system for a motor driven vehicle for use by a leg cripple, having vehicle control means, and fluid pressure supply; an operating cylinder having upper and lower ports and a piston reciprocal therein having a downwardly projection piston rod, operatively connected to said vehicle control means, a finger controlled master actuating and follow up valve having vacuum inlet and outlet ports and an air inlet port, a finger operative system for actuating said master valve and a fluid pressure operated fluid flow reversing valve mounted in said system adjacent said master valve comprising a hollow cylinder having substantially in alignment one above the other, a vacuum port, a port for connection to the upper port of the operating cylinder, and an air inlet port and at a spaced radial distance therefrom substantially in vertical alignment one above the other, an air inlet port, a port for connection to the lower port of the operating cylinder, a vacuum discharge port, and a piston operating port, an elongated piston vertically reciprocal in said cylinder having an axial slot therein movable from an upper position connecting said air inlet port to the port for connection to the upper port of the operating cylinder on actuating movement of said finger for downward movement of said operating cylinder piston to a lower position on shutting of said master valve connecting said operating cylinder port to said vacuum port for the upward movement of said operating cylinder piston and at a cooperating spaced radial distance with an elongated axial slot movable from an upper position connecting the port for connection to the lower port of the operating cylinder with the port for connection to the vacuum inlet port of said master valve for the downward movement of said operating cylinder piston on an actuating movement of said finger operative system to a lower position on shutting of said master valve connecting the air inlet port with the port for connection with the lower port of the operating cylinder for upward movement of said operating cylinder piston, spring means normally urging said elongated piston to its downmost position movable by the vacuum to its raised position against the pressure of said spring means, an air filter, lines connecting said air filter with the air inlet ports of said reversing valve and the air inlet port of said master valve, and the upper portion of the lower enlarged portion of the master valve, a line connecting the lower port of the operating cylinder with its port on the reversing valve, a line connecting the upper port of the operating cylinder with its port on the reversing valve, lines connecting the vacuum discharge port of the reversing valve and suction valve port of the reversing valve to the vacuum inlet port of the master valve, and a line connecting the enlarged cylindrical portion of the master valve to said line, and a by-pass suction line connecting a vacuum discharge port of the reversing valve to the intake manifold having a check valve therein adjacent the intake manifold and a suction line connecting the vacuum discharge port of the master valve to said line.

18. In a control system for a motor driven vehicle for use by a leg cripple, having vehicle control means, and fluid pressure supply means; an operating cylinder having a piston advancing port on one end thereof, and a piston retracting port on the other end thereof, and a piston reciprocal therein having a downwardly projecting piston rod, operatively connected to said vehicle control means, a finger controlled master actuating and follow up valve having inlet and outlet ports and a pressure relief port, a finger operated system for actuating said master valve and a fluid pressure operated fluid flow reversing valve mounted in said system adjacent said master valve comprising a hollow cylinder having substantially in alignment one above the other, a discharge port, a port for connection to the piston retracting port of the operating cylinder, and a power inlet port and at a spaced radial distance therefrom substantially in vertical alignment one above the other, a power inlet port, a port for connection to the piston advancing port of the operating cylinder, a discharge port, and a piston operating port, an elongated piston vertically reciprocal in said cylinder having an axial slot therein movable from a position connecting said power inlet port to the port for connection to the piston advancing port of the operating cylinder, on actuating movement of said finger for downward movement of said operating cylinder piston, to a position on shutting of said master valve connecting said operating cylinder piston retracting port with said discharge port for the upward movement of said operating cylinder piston and at a cooperating spaced radial distance with an elongated axial slot movable from a position connecting the port for connection to the piston advancing port of the operating cylinder with the discharge port for the downward movement of said operating cylinder piston on an actuating movement of said finger control system, to a position on shutting of said master valve connecting the power inlet port with the port for connection with the piston retracting port of the operating cylinder for upward movement of said operating cylinder piston, spring means normally urging said elongated piston to its piston retracting position movable by the flow to its piston advancing position against the pressure of said spring means, and lines connecting the piston advancing and piston retracting ports on said operating cylinder to their respective ports on the reversing valve, the fluid pressure supply means to the power and discharge ports of the reversing valve and the inlet, pressure relief and discharge ports and opposite ends of the enlarged cylinder piston of said master valve to said reversing valve, and fluid pressure supply means to permit the functioning of said valves, one of said lines having a check valve therein adjacent the fluid pressure supply means.

19. In a control system for a motor driven vehicle for use by a leg cripple, vehicle braking means, a source of fluid pressure supply, an operating cylinder and a piston reciprocal therein having a downwardly projecting piston rod, operatively connected to said vehicle braking means, a master actuating and follow up valve having finger controlled operating means, a fluid pressure operated fluid flow reversing valve and lines operatively connecting said operating cylinder with said source of fluid pressure supply, said master valve and said reversing valve, and a feel cylinder having a line connecting the lower end thereof to one of said lines having a piston reciprocal therein having a piston rod projecting upwardly from said cylinder operated by said master valve finger controlled operating means, said piston having an area at least thirty times smaller than that of the operating cylinder piston to reduce the pressure opposing forward movement of the finger to a finger resistant amount.

20. In a control system for a motor driven vehicle for use by a leg cripple, having vehicle control means, and a source of fluid pressure supply; an operating cylinder having upper and lower ports and a piston reciprocal therein having a downwardly projecting piston rod operatively connected to said vehicle control means, a master actuating and follow up valve comprising a cylindrical casing mounted adjacent said cylinder having a vacuum discharge port, an air inlet port and a vacuum inlet port and a portion of larger bore below said ports, a piston reciprocal in said enlarged portion, a sleeve reciprocal in nested relationship in the upper portion of said casing having cooperating vacuum exhaust, air inlet and vacuum inlet ports opposite said casing ports when in inoperative position and spring means in said enlarged portion normally urging said piston and sleeve upwardly to inoperative position, a hollow piston reciprocal in nested relationship within said sleeve having a vacuum inlet port aligned with said sleeve and casing vacuum inlet ports when in inoperative position, and a vacuum discharge port normally above said aligned sleeve and casing vacuum discharge ports when in inoperative position and an air inlet port normally aligned with said aligned sleeve and casing air inlet ports in inoperative position, a piston rod projecting upwardly from said hollow piston having an enlargement at the upper end thereof and spring means interposed between said casing and enlargement to normally urge said hollow piston to its upper inoperative position, a lever pivotably mounted on an extension from said casing having a work arm abutting the upper end of said piston rod, a finger operative member for actuating the power arm of said lever, a fluid pressure operated fluid flow reversing valve mounted adjacent said master valve comprising a hollow cylinder having substantially in alignment one above the other, a vacuum port, a port for connection to the upper port of the operating cylinder, and an air inlet port and at a spaced radial distance therefrom substantially in vertical alignment one above the other, an air inlet port, a port for connection to the lower port of the operating cylinder, a vacuum discharge port, for connection to the master cylinder vacuum inlet port and a piston operating port, an elongated piston vertically reciprocal in said cylinder having an axial slot therein movable from an upper position connecting said air inlet port to the port for connection to the upper port of the operating cylinder on actuating movement of said finger operative member for downward movement of said operating cylinder piston, to a lower position connecting said operating cylinder port to the said vacuum port for the upward movement of said operating cylinder piston and with an elongated axial slot movable from an upper position connecting the port for connection to the lower port of the operating cylinder with the port for connection to the vacuum inlet port of said master valve for the downward movement of said operating cylinder piston on an actuating movement of said finger operative member, to a lower position connecting the air inlet port with the port for connection with the lower port of the operating cylinder for upward movement of said operating cylinder piston, spring means normally urging said elongated piston to its downmost position movable by the vacuum to its raised position against the pressure of said spring means, an air filter, lines connecting said air filter with the air inlet ports of said reversing valve and the air inlet port of said master valve, and the upper portion of the lower enlarged portion of the master valve, a line connecting the lower port of the operating cylinder with its port on the reversing valve, a line connecting the upper port of the operating cylinder with its port on the reversing valve, a suction line connecting a vacuum discharge port of the reversing valve and suction valve port of the reversing valve to the vacuum inlet port of the master valve, a line connecting the enlarged cylindrical portion of the master valve to said line, and a by-pass suction line connecting a vacuum discharge port of the reversing valve to the intake manifold having a check valve therein adjacent the intake manifold and a line connecting the vacuum discharge port of the master valve to said line.

21. In a control system for a motor driven vehicle for use by a leg cripple, having vehicle control means; fluid pressure supply means, an operating cylinder having a piston advancing port at one end thereof and a piston retracting port at the other end thereof, and a piston reciprocal therein having a downwardly projecting piston rod operatively connected to said vehicle control means, a master actuating and follow up valve comprising a cylindrical casing mounted adjacent said cylinder having a discharge port, a pressure relief port and an inlet port and a portion of larger bore below said ports, a piston reciprocal in said enlarged portion, a sleeve vertically reciprocal in nested relationship in the upper portion of said casing having cooperating discharge, pressure relief and inlet ports opposite said casing ports when in inoperative position and spring means in said enlarged portion normally urging said piston and sleeve upwardly to inoperative position, a hollow piston reciprocal in nested relationship within said sleeve having cooperating discharge, pressure relief and inlet ports, one of said flow ports being out of alignment with its aligned sleeve and casing ports when in inoperative position, a piston rod projecting upwardly from said hollow piston having an enlargement at the upper end thereof and spring means interposed between said casing and enlargement to normally urge said hollow piston to its upper inoperative position, a lever pivotably mounted on an extension from said casing having a work arm abutting the upper end of said piston rod, a finger operative member for actuating the power arm of said lever, a fluid pressure operated fluid flow reversing valve mounted adjacent said master valve comprising a hollow cylinder having substantially in alignment one above the other, a discharge port, a port for connection to the piston retracting port of the operating cylinder, and a power port and at a spaced radial distance therefrom substantially in alignment one above the other, a power port, a port for connection to the piston advancing port of the operating cylinder, a discharge port, and a piston operating port, an elongated piston reciprocal in said cylinder having an axial slot therein movable from a position connecting said power port to the port for connection to the piston retracting port of the operating cylinder on actuating movement of said finger actuated member for downward movement of said operating cylinder piston, to a position on shutting of said master valve connecting said piston retracting port of the operating cylinder with said discharge port for the upward movement of said operating cylinder piston and at a cooperating spaced radial distance therefrom with an elongated axial slot movable from a position connecting the port for connection to the piston advancing port of the operating cylinder with the discharge port for the downward movement of said operating cylinder piston on an actuating movement of said finger actuated member, to a position on shutting of said master valve connecting the power inlet port with the port for connection to the piston advancing port of the operating cylinder for upward movement of said operating cylinder piston, spring means normally urging said elongated piston to its piston retracting position movable by the flow to its piston advancing position against the pressure of said spring means, and lines connecting the piston advancing and piston retracting ports on said operating cylinder to their respective ports on the reversing valve, the fluid pressure supply means to the power and discharge ports of the reversing valve and the inlet, pressure relief and discharge ports and opposite ends of the enlarged cylinder portion of said master valve to said reversing valve, and fluid pressure supply means to permit the functioning of said valves, one of said lines having a check valve therein adjacent the fluid pressure supply means.

22. In a control system for a motor driven vehicle for use by a leg cripple, having vehicle control means, an operating cylinder having a piston advancing port at one end thereof and a piston retracting port at the other end thereof, and a piston reciprocal therein having a downwardly projecting piston rod operatively connected to said vehicle control means, a master actuating and follow up valve comprising a cylindrical casing mounted adjacent said cylinder having a discharge port, a pressure relief port and an inlet port and a portion of larger bore below said ports, a piston reciprocal in said enlarged portion, a sleeve vertically reciprocal in nested relationship in the upper portion of said casing having cooperating discharge, pressure relief and inlet ports opposite said casing ports when in inoperative position and spring means in said enlarged portion normally urging said piston and sleeve upwardly to inoperative position, a hollow piston vertically reciprocal in nested relationship within said sleeve having inlet, discharge and pressure relief ports, one of said flow ports being out of alignment with its aligned sleeve and casing ports when in inoperative position, a piston rod projecting upwardly from said hollow piston having an enlargement at the upper end thereof and spring means interposed between said casing and enlargement to normally urge said hollow piston to its upper inoperative position, a lever pivotably mounted on an extension from said casing having a work arm abutting the upper end of said piston rod, a finger operative member for actuating said piston rod, a fluid pressure operated fluid flow reversing valve mounted adjacent said master valve comprising a hollow cylinder having substantially in alignment, one above the other, a discharge port, a port for connection to the piston retracting port of the operating cylinder, and a power port and at a spaced radial distance therefrom substantially in alignment, one above the other, a power port, a port for connection to the piston advancing port of the operating cylinder, a discharge port, and a piston operating port, an elongated piston reciprocal in said cylinder having an axial slot therein movable from a position connecting said power port to the port for connection to the piston retracting port of the operating cylinder on actuating movement of said finger actuated member for downward movement of said operating cylinder piston, to a position on shutting of said master valve connecting said piston retracting port of the operating cylinder with said discharge port for the upward movement of said operating cylinder piston and at a cooperating spaced radial distance therefrom with an elongated axial slot movable from a position connecting the port for connection to the piston advancing port of the operating cylinder with the discharge port for the downward movement of said operating cylinder piston on an actuating movement of said finger actuated member, to a position on shutting of said master valve connecting the power inlet port with the port for connection to the piston retracting port of the operating cylinder for upward movement of said operating cylinder piston, spring means normally urging said elongated piston to its piston retracting position movable by the flow to its piston advancing position against the pressure of said spring means, a fluid reservoir, a circulating pump, a power line from said circulating pump having a check valve therein adjacent said pump, having a branch connected to a power inlet port of said reversing valve and a branch connected to the inlet port of said master valve, a line connected to the discharge port and upper end of the enlarged cylindrical portion of the master valve with the other power inlet port of the reversing valve, lines connecting the piston advancing and piston retracting ports of the operating cylinder to their respective ports on the reversing valve, and lines connecting the discharge ports of the reversing valve and pressure relief port of said master valve to said fluid reservoir.

JOSEPH A. N. DUBREUIL.

REFERENCES CITED

The following references are of record in the file of this patent:

UNITED STATES PATENTS

| Number | Name | Date |
|---|---|---|
| 1,921,590 | Staude | Aug. 8, 1933 |
| 1,928,143 | Vasselli | Sept. 26, 1933 |
| 1,928,566 | Leupold | Sept. 26, 1933 |
| 1,964,693 | Hill | June 26, 1934 |
| 1,976,429 | Backlund et al. | Oct. 9, 1934 |
| 2,011,334 | Folberth et al. | Aug. 13, 1935 |
| 2,015,449 | Folberth et al. | Sept. 24, 1935 |
| 2,026,220 | Denker | Dec. 31, 1935 |
| 2,069,578 | Eaton | Feb. 2, 1937 |
| 2,432,712 | Bachman et al. | Dec. 16, 1947 |